US011359430B2

(12) United States Patent
Linden et al.

(10) Patent No.: US 11,359,430 B2
(45) Date of Patent: Jun. 14, 2022

(54) AUTOMATIC CLOSING DOORS SYSTEM WITH OBSTRUCTION DETECTION

(71) Applicant: Ford Global Technologies, LLC, Dearborn, MI (US)

(72) Inventors: Howard Paul Tsvi Linden, Southfield, MI (US); Onoyom Essien Ekanem, White Lake, MI (US); Hassan Mehdi, Canton, MI (US); Spurthi Varma Ganna, Farmington, MI (US); Rafic Jergess, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 189 days.

(21) Appl. No.: 16/743,303

(22) Filed: Jan. 15, 2020

(65) Prior Publication Data

US 2021/0214989 A1  Jul. 15, 2021

(51) Int. Cl.
| *E05F 15/73* | (2015.01) |
| *E05B 83/38* | (2014.01) |
| *E05F 15/40* | (2015.01) |
| *E05B 81/70* | (2014.01) |
| *B60J 5/06* | (2006.01) |
| *B60J 5/04* | (2006.01) |
| *E05F 15/79* | (2015.01) |

(52) U.S. Cl.
CPC ............ *E05F 15/73* (2015.01); *B60J 5/0473* (2013.01); *B60J 5/06* (2013.01); *E05B 81/70* (2013.01); *E05B 83/38* (2013.01); *E05F 15/40* (2015.01); *E05F 15/79* (2015.01); *E05Y 2900/531* (2013.01)

(58) Field of Classification Search
CPC ........................ B60J 5/0479; B60J 2005/0475
See application file for complete search history.

(56) References Cited

U.S. PATENT DOCUMENTS

| 6,037,727 A | 3/2000 | Kawanobe et al. |
| 6,213,535 B1 * | 4/2001 | Landmesser ........... B60J 5/0479 |
| | | 296/146.12 |

(Continued)

FOREIGN PATENT DOCUMENTS

| CN | 202810478 U | 3/2013 | |
| DE | 102011117792 A1 * | 5/2013 | ............... B60J 5/06 |

(Continued)

*Primary Examiner* — Marcus Menezes
(74) *Attorney, Agent, or Firm* — Vichit Chea; Price Heneveld LLP (57) ABSTRACT

An automatic door system for a vehicle may comprise a hinged door in connection with the vehicle configured to selectively enclose a continuous opening formed between a first and a second pillar of the vehicle, wherein the sliding door and the hinged door are configured to enclose the continuous opening without an intermediate support pillar. The system may also comprise the hinged door in a hinged position and controlled by a first power actuator. The system may also comprise the sliding door in connection with the vehicle configured to selectively enclose the continuous opening, wherein a second power actuator controls a sliding position of the sliding door. The system may further comprise proximity sensors and interference sensors to detect interfering obstructions, objects, and/or persons located within the interference zone.

20 Claims, 8 Drawing Sheets

(56) References Cited

U.S. PATENT DOCUMENTS

| | | | | |
|---|---|---|---|---|
| 6,328,374 B1* | 12/2001 | Patel | ............ | B60J 5/06 296/155 |
| 6,447,054 B1* | 9/2002 | Pietryga | ............ | B60J 5/0479 296/146.1 |
| 6,899,374 B1* | 5/2005 | Heard | ............ | B60J 5/047 296/155 |
| 7,798,557 B2* | 9/2010 | Elliott | ............ | E05D 15/1081 296/146.12 |
| 7,950,719 B2* | 5/2011 | Elliott | ............ | E05D 15/1081 296/155 |
| 9,777,528 B2 | 10/2017 | Elie et al. | | |
| 9,849,759 B2* | 12/2017 | Lovelace | ............ | B60J 5/0477 |
| 10,603,992 B2* | 3/2020 | Grupp | ............ | B60J 5/0479 |
| 10,633,908 B1* | 4/2020 | Loeb | ............ | E05D 15/101 |
| 2001/0022049 A1* | 9/2001 | Clark | ............ | B60J 5/06 49/360 |
| 2003/0107237 A1* | 6/2003 | Brodt | ............ | B60J 5/0479 296/146.12 |
| 2005/0110300 A1* | 5/2005 | Oxley | ............ | B60J 5/06 296/155 |
| 2009/0072583 A1* | 3/2009 | Elliott | ............ | B60J 5/0479 296/155 |
| 2010/0171336 A1* | 7/2010 | Elliott | ............ | B60J 5/06 296/146.12 |
| 2013/0031837 A1* | 2/2013 | Charnesky | ............ | E05B 81/16 49/31 |
| 2013/0042533 A1* | 2/2013 | Netherland, III | ....... | E05B 83/38 49/358 |
| 2013/0292955 A1* | 11/2013 | Higgins | ............ | B60Q 9/00 292/195 |
| 2016/0087565 A1* | 3/2016 | Watanabe | ............ | B60J 5/06 318/503 |
| 2020/0300027 A1* | 9/2020 | Brown | ............ | E05F 15/76 |
| 2020/0308882 A1* | 10/2020 | Salter | ............ | B60J 10/86 |
| 2021/0372173 A1* | 12/2021 | Okeke | ............ | E05B 85/04 |

FOREIGN PATENT DOCUMENTS

| | | | |
|---|---|---|---|
| DE | 102017008872 A1 * | 3/2019 | ............ B60J 5/06 |
| JP | 2005014839 A | 1/2005 | |
| JP | 2010216093 A | 9/2010 | |
| JP | 5076649 B2 | 11/2012 | |

\* cited by examiner

AUTOMATIC CLOSING DOORS SYSTEM WITH OBSTRUCTION DETECTION

FIELD OF THE INVENTION

The present disclosure relates to vehicle doors and, more particularly, to vehicles having power doors.

BACKGROUND OF THE INVENTION

In an effort to improve vehicle operation and convenience, many manufacturers have introduced a variety of convenience and operating features to vehicles. However, many components and systems of vehicles remain significantly similar to conventional vehicle designs dating back to the previous century. The disclosure provides for various systems and apparatuses to provide for improved operation of at least one door of a vehicle. The systems discussed herein may include doors configured to open and close automatically between a vehicle that has a continuous opening between a first pillar and second pillar. Such systems may provide for improved operation of a vehicle as described herein.

SUMMARY

According to one aspect of the present invention, an automatic door system for a vehicle is disclosed. The system comprises a hinged door in connection with the vehicle configured to selectively enclose a continuous opening formed between a first pillar and a second pillar of the vehicle. A first power actuator controls a hinged position of the hinged door. A sliding door encloses the continuous opening formed between the first pillar and the second pillar. A second power actuator controls a sliding position of the sliding door. The system also comprises a first latch assembly configured to couple a distal end of the hinged door to the vehicle and a second sliding door. A latch assembly sensor is electrically coupled to the second latch assembly. A controller of the system determines the hinged door position and the sliding position. In response to receiving a door operation command to close the hinged door with the sliding door being in a closed sliding position and the hinged door being in an open hinged position, the controller controls the second power actuator to movably engage the sliding door to a partially open position. The controller also controls the first power actuator to movably engage the hinged door from an open hinged position to a closed hinged position as the closed hinged position covers a first portion of the continuous opening and the distal end of the hinged door engages with the vehicle. The controller is also configured to control the second power actuator to return the sliding door from the partially open sliding position to a closed sliding position, as the closed sliding position covers a second portion of the continuous opening. The controller also receives a sliding latch signal via the latch assembly sensor, wherein the sliding door is in the closed sliding position and the adjacent end of the sliding door engages with the distal end of the hinged door.

In response to the door operation command to close the hinged door and the sliding door, with the hinged door and the sliding door being in an open hinged position and an open sliding position, respectively, the controller is further configured to:
control the first actuator and the second actuator to adjust a position of the hinged door and the sliding door, respectively; and
hold the sliding door in a hold position as the sliding door approaches the partially open position to allow the first actuator to adjust the hinged door into a closed hinged position;
wherein the partially open position comprises the second actuator to movably operate the sliding door approximately 50 mm to 300 mm away from the distal end of the hinged door creating an interference zone within the continuous opening;
further comprises a proximity sensor coupled to the distal end of the hinged door, wherein the proximity sensor is configured to detect an obstruction in the continuous opening between the distal end of the hinged door and the adjacent end of the sliding door;
wherein the controller is configured to adjust a detection range of the proximity sensor in response to a change in the position of the sliding door as communicated by the sliding door position sensor;
wherein the controller is further configured to hold the sliding door from movably covering the continuous opening for a set time, in response to the proximity sensor detecting the obstruction;
further comprises a user interface coupled to an outside panel of the vehicle, wherein the controller is further configured to reverse a movement of at least one of the hinged door and the sliding door via the first power actuator and the second power actuator, respectively, in response to receiving a stop door operation input as communicated by the user interface;
further comprises a proximity sensor coupled to a handle of the hinged door, wherein the proximity sensor is configured to detect an obstruction in the continuous opening between the distal end of the hinged door and the adjacent end of the sliding door;
further comprises a sliding door position sensor in connection with the second power actuator, wherein the controller is configured to adjust a detection range of the proximity sensor in response to a change in the position of the sliding door as communicated by the sliding door position sensor;
wherein the controller is further configured to stop the sliding door from movably enclosing the continuous opening for a set time, in response to the proximity sensor detecting the obstruction; and
wherein the sliding door and the hinged door are configured to enclose the continuous opening without a stabilizing beam.

According to another aspect of the present invention, a method of a door system comprising a continuous opening formed between a first pillar coupled to a proximal end of a hinged door of the vehicle and a second pillar coupled to a sliding door assembly of the sliding door of the vehicle with the hinged door being in an open hinged position and the sliding door being in an open sliding position is disclosed. The method comprises determining a hinged door position and a sliding door position, receiving a door operation command, and controlling a first actuator to adjust the hinged door to a closed hinged position. The method also comprises controlling a second actuator to hold the sliding door in a hold position as the sliding door approaches a partially open position as communicated by a sliding door position sensor. The method also comprises determining the hinged door is in a closed hinged position, controlling the second actuator to return the sliding door from a partially open position to a closed sliding position, and detecting a sliding latch signal via a latch assembly sensor, wherein the sliding door is in the closed sliding position and an adjacent end of the sliding door couples to the distal end of the hinged door.

Further comprising adjusting a detection range of a proximity sensor coupled to a distal end of the hinged door configured to detect a sliding door edge in response to a change in the position of the sliding door as communicated by a sliding door position sensor.

Further comprising stopping the sliding door from movably enclosing the continuous opening for a set time, in response to the proximity sensor detecting an obstruction between the hinged door in a closed position and the sliding door in at least one of a partially open position and an open sliding position.

Further comprising adjusting a detection range of a proximity sensor coupled to a hinged door handle configured to detect a sliding door edge in response to a change in the position of the sliding door as communicated by a sliding door position sensor.

According to another aspect of the present disclosure, an automatic door system is disclosed. An automatic door system of a vehicle comprises a continuous opening formed between a first pillar and a second pillar of the vehicle and a hinged door coupled to the vehicle controlled by a first power actuator configured to selectively cover a first portion of the continuous opening. The automatic door system comprises a sliding door coupled to the vehicle configured to selectively enclose a second portion of the continuous opening, wherein a sliding position of the sliding door is controlled by a second power actuator. The system also comprises a latch assembly configured to engage a distal end of the hinged door with an adjacent end of the sliding door, a sliding door position sensor in connection with the second power actuator, and a latch assembly sensor electrically coupled to the latch assembly configured to detect the distal end of the hinged door to engage with the adjacent end of the sliding door. The system further comprises a controller configured to detect the hinged door is in a closed hinged position and the sliding door is in an open sliding position as communicated by the sliding door position sensor. In response to a door operation command, the controller is also configured to control the second power actuator to movably engage the sliding door along a track from the open sliding position to a closed sliding position, wherein the closed sliding position covers a second portion of the continuous opening. The controller also detects a sliding latch signal via the latch assembly sensor, wherein the sliding door is in the closed sliding position and the adjacent end of the sliding door engages with the distal end of the hinged door.

Further comprises a proximity sensor coupled to the distal end of the hinged door, wherein the proximity sensor is configured to detect an obstruction in the continuous opening between the distal end of the hinged door and the adjacent end of the sliding door;

wherein the controller is configured to adjust a detection range of the proximity sensor in response to a change in the position of the sliding door as communicated by the sliding door position sensor;

wherein the controller is further configured to stop the sliding door from movably enclosing the continuous opening for a set time, in response to the proximity sensor detecting the obstruction; and     further comprises a proximity sensor coupled to a handle of the hinged door, wherein the proximity sensor is configured to detect an obstruction in the continuous opening between the distal end of the hinged door and the adjacent end of the sliding door.

DETAILED DESCRIPTION

As required, a detailed description of the present disclosure is disclosed herein. However, it is to be understood that the disclosed implementations are merely exemplary of the disclosure that may be embodied in various and alternative forms. The figures do not necessarily reflect accurate dimensions or proportions of a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

An automatic door system for a vehicle may comprise a hinged door and a sliding door in connection with the vehicle configured to selectively enclose a continuous opening formed between a first and a second pillar of the vehicle. The sliding door and the hinged door are configured to enclose the continuous opening without an intermediate support pillar. The system may also comprise the hinged door in a hinged position and controlled by a first power actuator. The system may also comprise the sliding door in connection with the vehicle configured to selectively enclose the continuous opening, wherein a second power actuator controls a sliding position of the sliding door. The system may further comprise proximity sensors and interference sensors to detect interfering obstructions, objects, and/or persons located within the interference zone.

The system may be particularly beneficial for less abled or mobility impaired individuals who may not be capable of closing vehicle doors after a ride without further assistance. The system may also have a strong attraction for businesses specializing in vehicles for hire (e.g., taxis, autonomous vehicles systems) because some users may walk away from the vehicle without closing the doors of a vehicle at the end of their ride. Furthermore, the system may also have a strong attraction for caregivers transporting their dependents who are not capable of closing vehicles doors themselves, such as parent/child relationships or home health aides transporting their patients, etc.

Figure 1A:
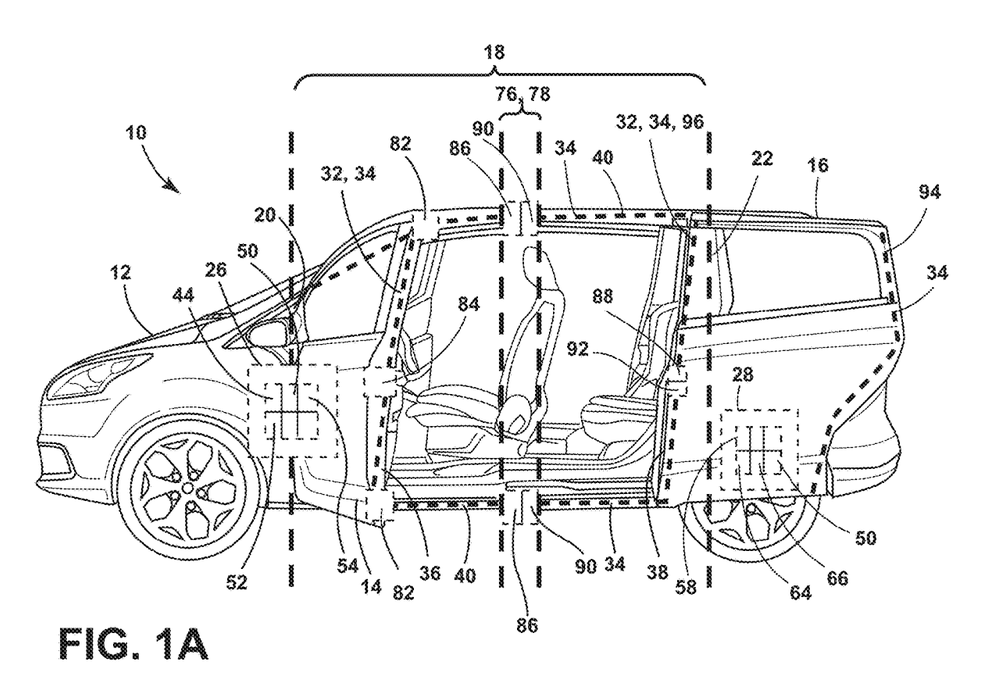
FIG. 1A is a projected view of a vehicle comprising an automatic door system configured to detect an object or obstruction in a continuous opening between a hinged door and a sliding door of a vehicle.
Figure 1B:
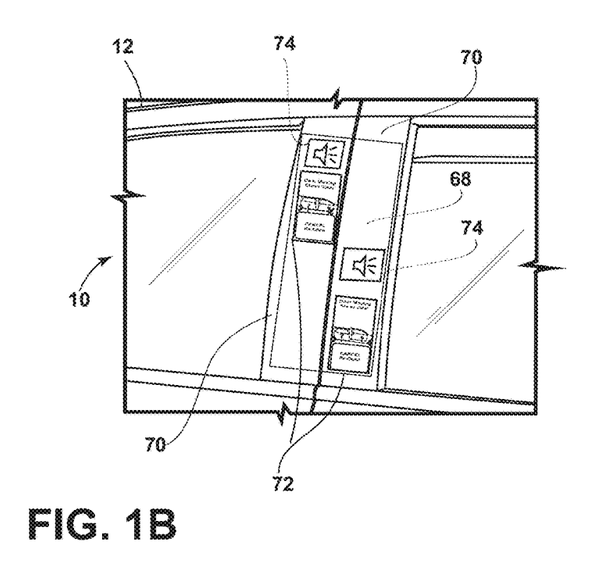
FIG. 1B is a detailed view of an exterior panel of the vehicle with a display.
Figure 1C:
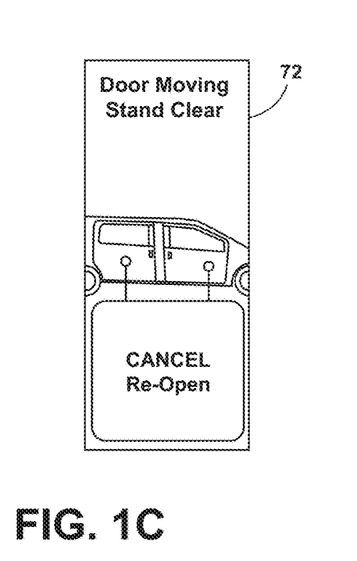
FIG. 1C is a detailed view of the display located on an exterior panel of the vehicle.

Referring to FIGS. 1A-1C, a projected view of an automatic door system 10 of a vehicle 12 includes a hinged door 14 and a sliding door 16 without an intermediate support pillar. The door system 10 may be configured to moveably enclose a continuous opening 18 between a first pillar 20 and a second pillar 22. The system 10 may also include a controller 24 (shown in FIGS. 3A-3D and 5) in communication with a first power actuator 26. In operation, the controller 24 may be configured to monitor or determine a hinged door position and whether the hinged door 14 is in a closed hinged position enclosing a first portion of the continuous opening or in an open hinged position. The system 10 may also include a second power actuator 28 in communication with the controller 24 that controls a sliding door position. Further details regarding the controller 24 are discussed in reference to FIG. 5 of the disclosure.

Figure 2A:
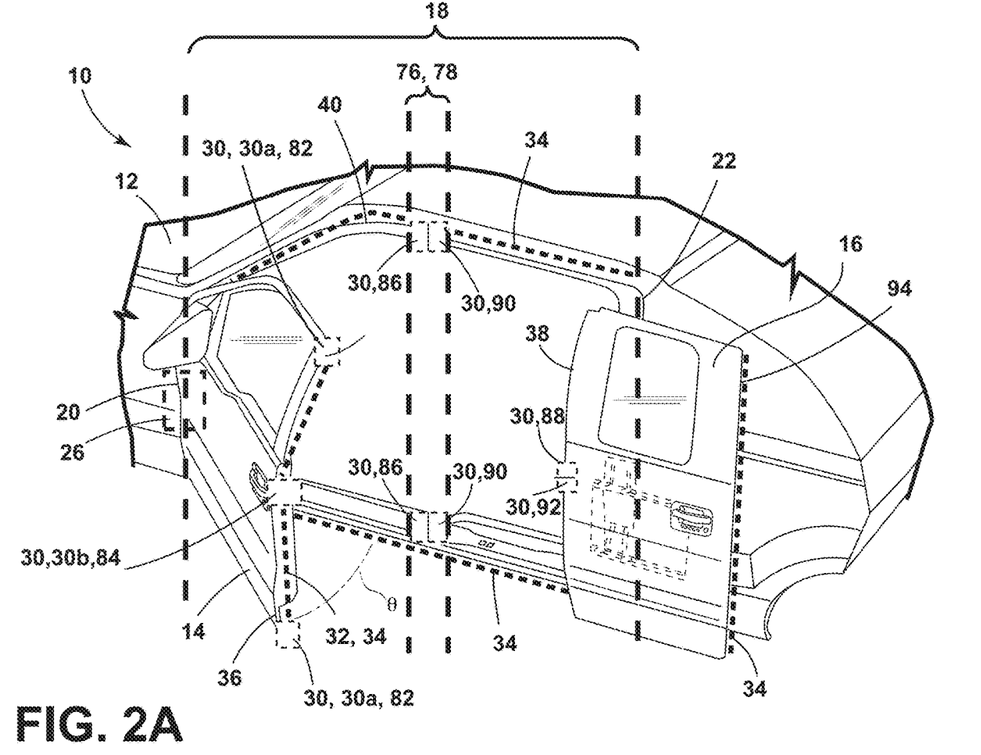
FIG. 2A is a projected view of a continuous opening between a hinged door and a sliding door of the vehicle demonstrating a latching mechanism of a rear sliding door and a front-hinged door.

In order to securely close the doors 14, 16, the system 10 may include a latch assembly 30 (as shown in FIG. 2A) in communication with the controller 24 and configured to engage the sliding door 16 and the hinged door 14, as well as determine a latch position. The latch position may correspond to an indication that the sliding door 16 and the hinged door 14 are latched or secured in a closed configuration. Based on various states of the doors 14, 16, the controller 24 may also prevent vehicle movement, engine ignition, or various vehicle operations in response to the controller 24 detecting the sliding door position, the hinged door position, and/or the latch position.

Figure 3A:
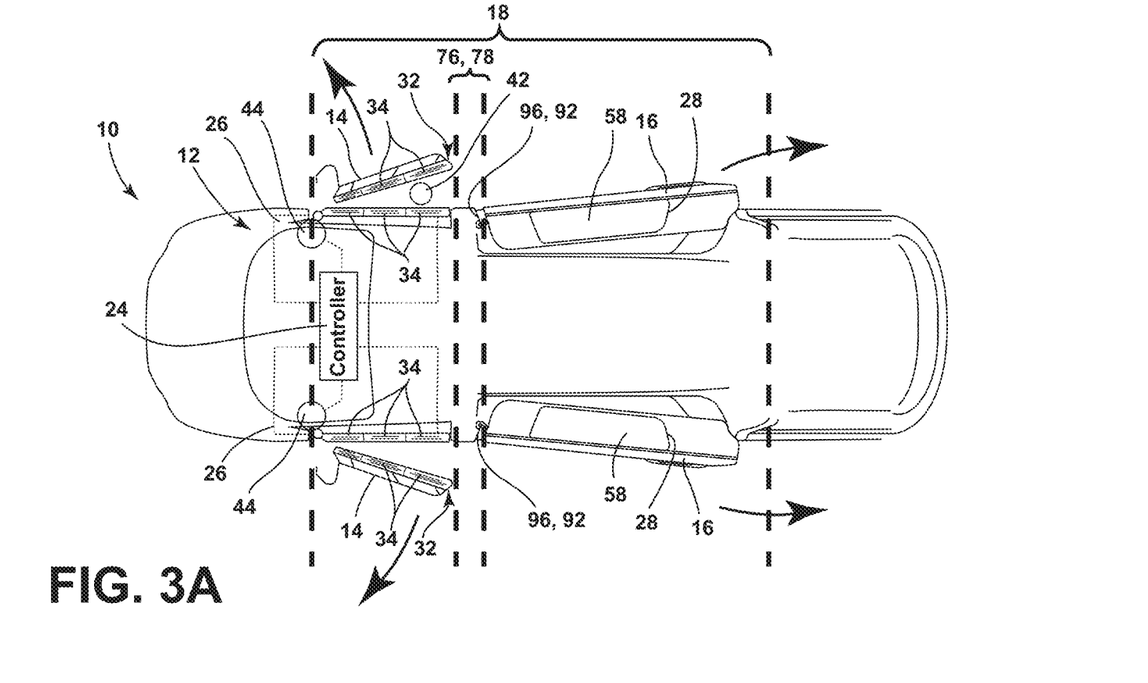
FIG. 3A is a top schematic view of a vehicle comprising an automatic door system of a rear sliding door in a half-open position and a front-hinged door in an open position demonstrating a continuous opening and an interference zone.
Figure 3B:
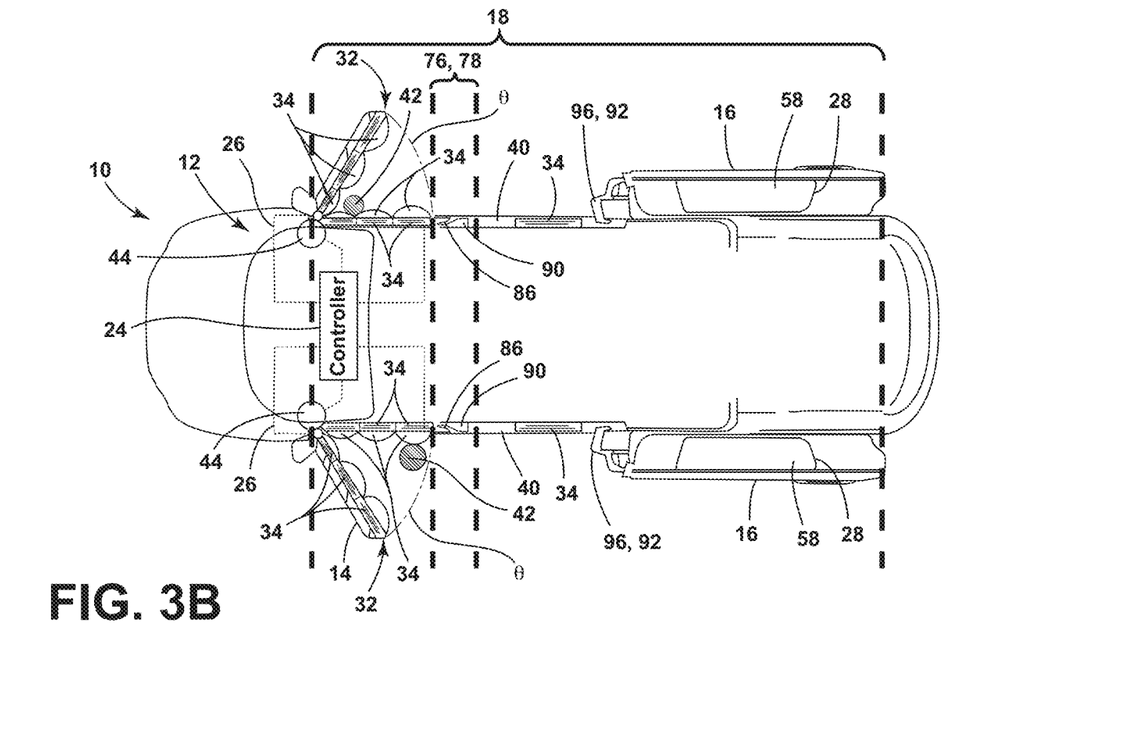
FIG. 3B is a top schematic view of a vehicle comprising an automatic door system of a rear sliding door in an open position and a front-hinged door in a half-open position demonstrating an interference zone.

In some implementations, the system 10 may further include at least one of proximity sensor 32 and a plurality of interference sensors 34 coupled to at least a portion of a hinged door edge 36 of the hinged door 14, a sliding door edge 38, a sliding door rear edge 94 of the sliding door 16, and/or a vehicle body edge 40 of the vehicle 12. In some implementations, the proximity sensors 32 may be coupled to a handle of the hinged door 14. The sensors 32, 34 may also be in communication with the controller 24 to determine if any kind of obstruction 42 (as shown in FIGS. 3A-3B) is in a pathway of the hinged door 14 or the sliding door 16. As discussed herein, the proximity sensors 32 may be configured to detect a distance or proximity of an object relative to a sensory mechanism. The interferences sensors 34 may similarly be configured to detect a presence or contact with obstructions.

The first power actuator 26 may be in communication with the controller 24 and may be configured to detect and control the angular position $\phi$ of the hinged door 14. The first power actuator 26 may be any type of actuator that is capable of transitioning the hinged door 14 about a hinge assembly 44, including, but not limited to, electric motors, servo motors, electric solenoids, pneumatic cylinders, hydraulic cylinders, etc. The first power actuator 26 may be connected to the hinged door 14 by gears (e.g., pinion gears, racks, bevel gears, sector gears, etc.), levers, pulleys, or other mechanical linkages. The first power actuator 26 may also act as a brake by applying a force or torque to prevent the transitioning of the hinged door 14 between the open position and the closed position. The first power actuator 26 may include a friction brake to prevent the transition of the hinged door 14 about the hinge assembly 44.

The second power actuator 28 may be in communication with the controller 24 (shown in FIG. 5) and configured to detect and control the sliding position of the sliding door 16. The second power actuator 28 may be any type of actuator that is capable of transitioning the sliding door 16 about a sliding assembly 58, including, but not limited to, electric motors, servo motors, electric solenoids, pneumatic cylinders, hydraulic cylinders, etc. The second power actuator 28 may be connected to the sliding door 16 by gears (e.g., pinion gears, racks, bevel gears, sector gears, etc.), levers, pulleys, or other mechanical linkages. The second power actuator 28 may also act as a brake by applying a force or torque to prevent the transitioning of the sliding door 16 between the open position and the closed position. The second power actuator 28 may include a friction brake to prevent the transition of the sliding door 16 about the sliding assembly 58.

Continuing in reference to FIGS. 1B and 1C, the system 10 may further comprise a user interface 68 in communication with the controller 24 coupled to an outside panel 70 of the vehicle 12. The user interface 68 may comprise at least one display 72 in communication with the controller 24. In various implementations, the user interface 68 may comprise a plurality of displays in communication with the controller 24. As illustrated in FIG. 1C, the display 72 notifies a user that the hinged door 14 and/or the sliding door 16 is moving by displaying notification words such as "Stand Back Door Closing" or "Cancel/Re-open". The display 72 may also allow a user to input a door operation command, thus giving the user the option of selecting and/or canceling a selected door operation command. The door operation command may include an option to open the sliding door 16, close the sliding door 16, open the hinged door 14, and/or close the hinged door 14.

The interface 68 may also comprise at least one speaker 74 in communication with the controller 24. In various examples, the user interface 68 may comprise a plurality of speakers in communication with the controller 24. In operation, the controller 24 may send an audio signal to the speaker 74 in response to receiving the door operation command. The speaker 74 may then sound an audible signal identifying the operation, such as a broadcast of words similar to "Stand Back Door Closing/Opening" or merely a broadcast of audible tones. In various implementations, the broadcast of the audible tones may fluctuate in frequency depending on the position of each door 14, 16. For example, as the sliding door 16 approaches a partially open position 76 (as shown in FIG. 1A), the audio sounds may broadcast a higher frequency than when the sliding door 16 is closing in an interference zone 78 (as shown in FIG. 1A). Another example may be the audible sounds change in frequency as each door 14, 16 is opening versus when each door 14, 16 is closing. The controller 24 may be configured to send an audio signal to the speaker 74 and a flashing display signal to the display 72 in response to receiving at least one of the operation signal and the stop door signal.

The interference zone 78 may correspond to a portion of the continuous opening 18 proximate to an intersection or interface between the hinged door 14 and the sliding door 16. For example, the distal end portion of the hinged door 14 may define an intersection or connection region between the hinged door 14 and the sliding door 16. The interference zone 78 may extend over a region proximate to the intersection, which may be approximately 20 mm-300 mm from the distal end portion of the hinged door when positioned in the closed or latched position. The partially open position 76 may be defined (e.g., programmed in a memory or operating instructions of the controller 24) to position the sliding door edge 38 of the sliding door 16 in a spaced configuration, which may be approximately 20 mm-300 mm from the distal end portion of the hinged door when positioned in the closed or latched position. In this configuration, the partially open position 76 locates the sliding door 16 in a spaced relationship relative to the hinged door in order to prevent interference in the interference zone 78.

Figure 2B:
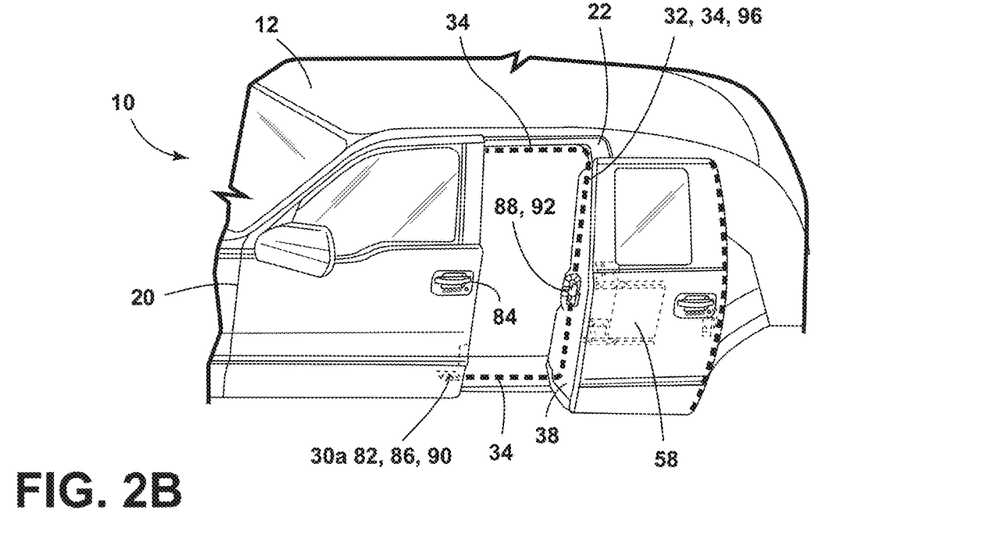
FIG. 2B is projected view of a continuous opening between a hinged door and a sliding door of the vehicle demonstrating a latching mechanism of a front-hinged door in a closed position and a rear sliding door in an open position.
Figure 2C:
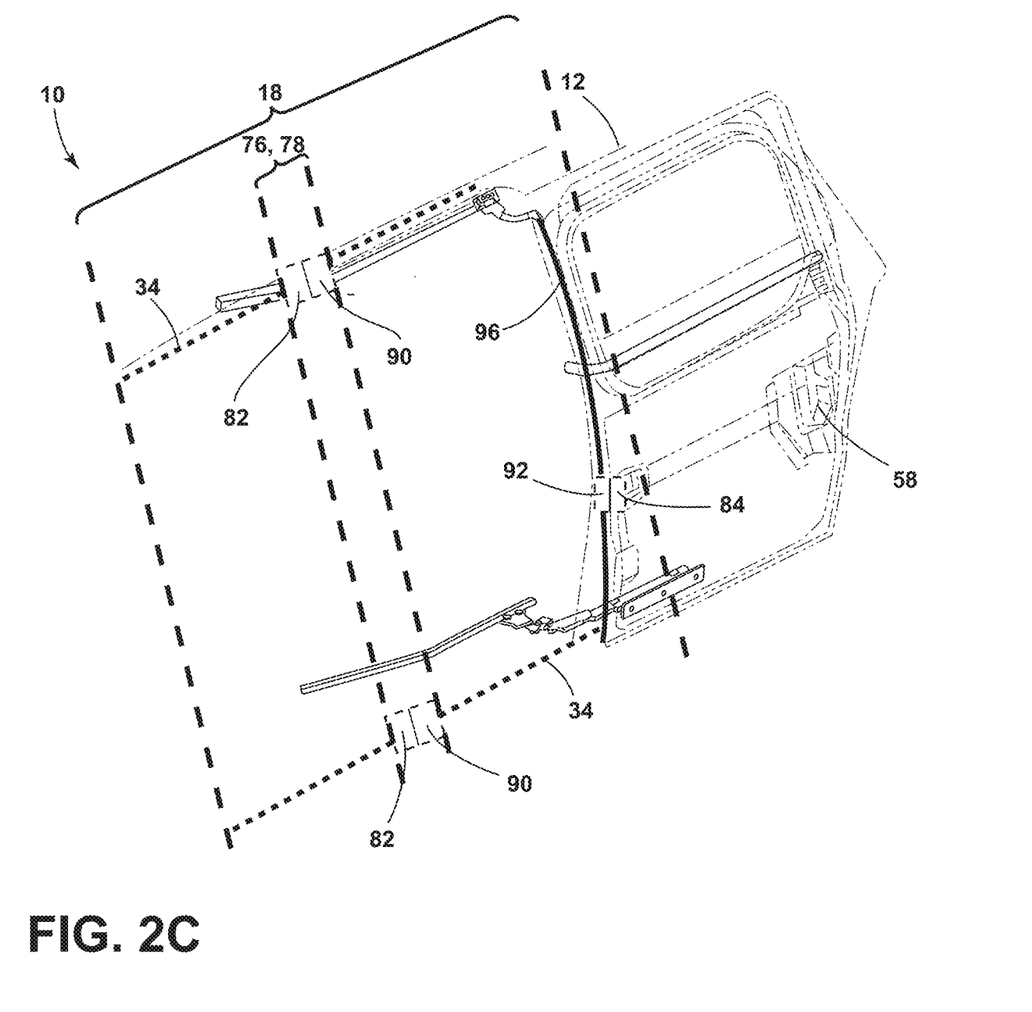
FIG. 2C is a projected view of a vehicle demonstrating a position of sensors on a rear sliding door and a vehicle frame.

Now referring to FIGS. 2A-2C, the latch assembly 30 may comprise a first mechanism 82 and a second mechanism 84 coupled to the hinged door 14. The latch assembly 30 may also comprise a third mechanism 86 coupled to the vehicle body edge 40 opposite the first mechanism 82 and a fourth mechanism 88 coupled to the sliding door edge 38 opposite the second mechanism 84. The latch assembly 30 may operate as the first mechanism 82 located on a distal end of the hinged door 14 couples to the third mechanism 86 located on the vehicle 12 allowing the first latch assembly 30a to be configured in such a way that the distal end of the hinged door couples to the vehicle 12. The latch assembly 30 may also comprise a second latch assembly 30b wherein the second mechanism 84 located on the distal end of the hinged door 14 couples to the fourth mechanism 88 located on the sliding door edge 38 allowing the second latch assembly 30b to be configured in a way that engages the distal end of the hinged door 14 with an adjacent end of the sliding door 16. The latch assembly 30 may further comprise a first latch assembly sensor 90 and a second latch assembly sensor 92. In some implementations, the system 10 may comprise a plurality of first mechanisms and a plurality of second mechanisms coupled to various locations on the hinged door 14. In various implementations, the system 10 may have a plurality of third mechanisms coupled to the vehicle body edge 40 and/or a plurality of fourth mechanisms coupled to the sliding door edge 38.

In the exemplary implementation, the first mechanism 82 may engage with the third mechanism 86 on the vehicle body edge 40 securing the hinged door 14 to the vehicle 12. The system 10 may also comprise a first latch assembly sensor 90 in communication with the controller 24 to determine if the first mechanism 82 properly engages with the third mechanism 86 and the hinged door 14 is in the closed position. Additionally, the second mechanism 84 may be coupled to the hinged door 14 and engage with the fourth mechanism 88 coupled to the sliding door 16, securing the sliding door 16 to the hinged door 14. The system 10 may also comprise a second latch assembly sensor 92 in communication with the controller 24 to determine if the second mechanism 84 properly engages with the fourth mechanism 88 and the sliding door 16 is properly secured to the hinged door 14 and the vehicle, thus allowing the second latch assembly sensor 92 to send a sliding latch signal to the controller 24 as the sliding door 16 is in the closed sliding position and the adjacent end of the sliding door engages with the distal end of the hinged door. For example, U.S. Pat. No. 7,798,557, entitled "VEHICLE UNGUIDED FOUR-BAR REAR DOOR ARTICULATING AND SLIDING MECHANISM," describes a similar hinged door and sliding door coupling to a vehicle without a b-pillar.

Referring now to FIGS. 2A and 2C, the projected view of the vehicle 12 demonstrating a position of sensors on the hinged door 14, the sliding door 16, and the vehicle body edge 40 is shown. In one example, the sensors may be a plurality of interference sensors 34, which may be activated in response to receiving a door operation command. Also, the interference sensors 34 may be implemented by a variety of devices. In some implementations, the sensors 32, 34 may be utilized in combination with the first power actuator 26, the second power actuator 28, the hinged door position sensor 52, and the sliding door position sensor 64 to detect and control the motion of the hinged door 14 and the sliding door 16, respectively. The plurality of interference sensors 34 may correspond to one or more capacitive, magnetic, inductive, optical/photoelectric, laser, acoustic/sonic, radar-based, Doppler-based, thermal, and/or radiation-based proximity sensors. In some instances, the plurality of interference sensors 34 may correspond to an array of infrared (IR) sensors configured to emit a beam of IR light and compute a distance to an object in an interference zone 78 based on characteristics of a returned, reflected, or blocked signal. The returned signal may be detected using an IR photodiode to detect reflected light-emitting diode (LED) light, responding to modulated IR signals, and/or triangulation.

In some examples, the plurality of interference sensors 34 may comprise an at least one primary interference sensor and an at least one secondary interference sensor coupled to the sliding door 16, wherein the at least one primary interference sensor comprises at least one ultrasonic sensor and the at least one secondary interference sensor comprises at least one of an inductive sensor, a capacitive sensor, and a photoelectric sensor. The plurality of interference sensors 34 may be positioned in multiple locations on the vehicle 12. For example, the interference sensors 34 may be positioned on the hinged door edge 36, the sliding door edge 38, and/or the vehicle body edge 40. In some examples, the interference sensors 34 may also be positioned along a sliding door rear edge 94 to detect and control the motion of the sliding door 16.

The interference sensors 34 may be implemented as a plurality of sensors or an array of sensors configured to detect an object in the interference zone 78. Such sensors may include but are not limited to, touch sensors, surface/housing capacitive sensors, inductive sensors, video sensors (such as a camera), light field sensors, etc. Capacitive sensors and inductive sensors may be utilized to detect obstructions 42, objects, and/or persons in the interference zone 78 of the hinged door 14 and/or the sliding door 16 of the vehicle 12 to ensure each door 14, 16 is properly positioned by the first power actuator 26 and second power actuator 28 from the open position to the closed position.

The interference sensor 34 may be configured to detect objects or obstructions 42 in the interference zone 78 in a plurality of detection regions. For example, the detection regions may comprise a first detection region, a second detection region, and a third detection region. In the exemplary embodiment, the first detection region may be between the first power actuator 26 and the third mechanism 86. The second detection region may be between the third mechanism 86 and extended at least approximately 50 mm to 300 mm towards the sliding door 16. The third detection region may extend from the third mechanism 86 to the end of the vehicle 12. In this configuration, the interference sensor 34 may be configured to detect the presence of an object in a particular detection region and communicate the detection of that object to the controller 24, such that the controller 24 may control the first power actuator 26 or second power actuator 28 accordingly. The detection regions may provide information regarding the position of an object, obstruction, or persons to accurately respond to and control the first power actuator 26 to change a direction or halt the movement of the hinged door 14 and/or the sliding door 16 prior to contact with the object. For example, U.S. Pat. No. 9,777,528 B2, entitled "OBJECT DETECTION AND METHOD FOR VEHICLE DOOR ASSIST SYSTEM," describes interference sensors of variable sensitivities for each detection region and the disclosure is incorporated herein by reference in its entirety.

Continuing in reference to FIGS. 2A-2C, a projected view of the vehicle 12 demonstrating a position of sensors on the hinged door 14, the sliding door 16, and the vehicle body edge 40 is shown. In some implementations, the sensors may also be configured to be a plurality of proximity sensors 32 and/or interference sensors 34. The plurality of proximity sensors 32 may include, but are not limited to, touch sensors, surface/housing, ultra-sonic, capacitive sensors, inductive sensors, video sensors (such as a camera), light field sensors, etc. Capacitive sensors, ultra-sonic sensors, and inductive sensors may be utilized to detect obstructions, objects, and/or persons in an interference zone 78 of the hinged door 14 and/or the sliding door 16 of the vehicle 12 to ensure each door 14, 16 is properly positioned by the first power actuator 26 and second power actuator 28 from the open position to the closed position. In one example, the plurality of proximity sensors 32 may comprise at least one first group of proximity sensors and a second group of proximity sensors, wherein the first group of proximity sensors comprises a plurality of ultrasonic sensors and the second group of proximity sensors comprises at least one of a group of inductive sensors, a group of capacitive sensors, a group of inductive sensors, and a group of photoelectric sensors.

Yet another implementation may comprise the plurality of proximity sensors 32 to be a plurality of rear-facing ultra-sonic sensors coupled to the hinged door 14 configured to detect the sliding door 16. In another implementation, the proximity sensors 32 may be a plurality of forward-facing ultra-sonic sensors coupled to the sliding door 16 configured to detect the closed hinged door 14. In other examples, the controller 24 is configured to adjust the detection range of the proximity sensor in response to a change in the position of the sliding door as communicated by the sliding door position sensor 64 and discussed in FIGS. 3A-3E.

The proximity sensors 32 may be in communication with the controller 24. The controller 24 may activate the proximity sensors 32 in response to the sliding door 16 reaching a partially open position 76 as the sliding door 16 approaches approximately 50 mm to 300 mm from the closed hinged door 14 and/or the third mechanism 86. In another embodiment, the controller 24 may send an additional operation signal to the user interface 68 congruently or simultaneously as the controller 24 activates the proximity sensors 32. The additional operation signal may be similar to the operation signal discussed above (e.g., the display flashes, the audible signal identifying the operation is sent to the speakers, etc.).

Now referring to FIGS. 3A-3E, the hinged door position sensor 52 may correspond to a variety of rotational or position sensing devices. In some embodiments, the hinged door position sensor 52 may correspond to an angular position sensor configured to communicate the angular position $\phi$ of the door to the controller 24. The angular position $\phi$ may be utilized by the controller 24 to control the motion of the first power actuator 26. The hinged door position sensor 52 may correspond to an absolute and/or relative position sensor. Such sensors may include, but are not limited to, quadrature encoders, potentiometers, accelerometers, etc. The hinged door position sensor 52 may also correspond to optical and/or magnetic rotational sensors. Other sensing devices may also be utilized for the hinged door position sensor 52 without departing from the spirit of the disclosure.

The sliding door position sensor 64 may correspond to a variety of position sensing devices. In some embodiments, the sliding door position sensor 64 may be utilized by the controller to control the motion of the second power actuator 28. The sliding door position sensor 64 may correspond to an absolute and/or relative position sensor. Such sensors may include, but are not limited to, quadrature encoders, potentiometers, accelerometers, etc. The sliding door position sensor 64 may also correspond to optical and/or magnetic rotational sensors. Other sensing devices may also be utilized for the sliding door position sensor 64 without departing from the spirit of the disclosure. An example of an opening and closing control device of a vehicle sliding door for opening a vehicle sliding door installed on a side of a vehicle body is provided in U.S. Pat. No. 6,037,727, entitled "DEVICE FOR AUTOMATICALLY CONTROLLING THE CLOSURE OF A SLIDING DOOR FOR A VEHICLE", the disclosure of which is incorporated herein by reference in its entirety.

Referring now to FIGS. 3A and 3B the sliding door 16 and the hinged door 14 are shown controlled through an opening operation. For example, as shown in FIG. 3A, the sliding door 16 and the hinged door 14 are shown in partially open orientations. The arrows in FIG. 3A may demonstrate a motion of the sliding door 16 and the hinged door 14 controlled by the controller 24. From the partially open positions shown in FIG. 3A, the controller 24 may control the position and orientation of the doors 14 and 16 to the fully open configuration shown in FIG. 3B. Throughout the operation of the power actuators 26 and 28, the controller 24 may monitor signals from the proximity sensors 32 and the interference sensors 34 to determine if an obstruction is identified anywhere along a travel path of the hinged door 14 or the sliding door 16.

Figure 3C:
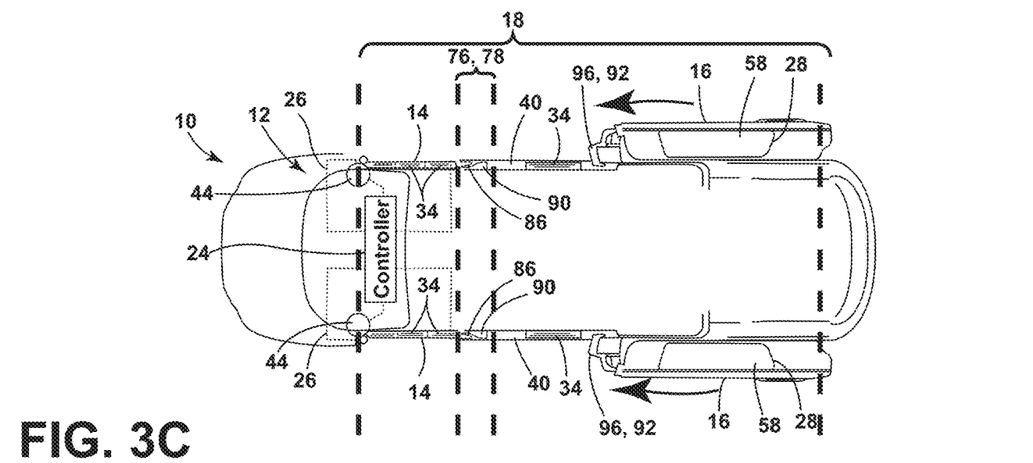
FIG. 3C is a top schematic view of a vehicle comprising an automatic door system of a rear sliding door in an open position and a front-hinged door in a closed position demonstrating a continuous opening and an interference zone.

Referring now to FIGS. 3B and 3C the hinged door 14 is shown controlled through a closing operation. As further discussed in reference to the flow charts of FIGS. 4A and 4B, the door closing operation may be activated by the controller 24 in response to an input to the user interface 68. In response to the input, the controller 24 may activate the display 72 to display a "Cancel/Re-open" user input option. Additionally, the controller 24 may control the first power actuator 26 to reposition the hinged door 14 in the closed and latched configuration. As the motion of the hinged door 14 is controlled, the controller 24 may activate the proximity sensor 32 and the plurality of interference sensors 34 to detect an obstruction proximate the hinged door 14. In response to the detection, the controller 24 may control the first power actuator 26 to hold a position of the hinged door 14 for a set time such as three seconds. The controller 24 may also control the display 72 to flash one or more messages indicating the detection of the obstruction. In response to a selection of the "Cancel/Re-open" user input option, the controller 24 may cancel the closing door operation and reposition the hinged door 14 to the open hinged position. The controller 24 may respond by activating the first power actuator 26 to again attempt to perform the closing door operation of the hinged door 14 if no input signal is detected to instruct the hinged door 14 to "Cancel/Re-open".

Figure 3D:
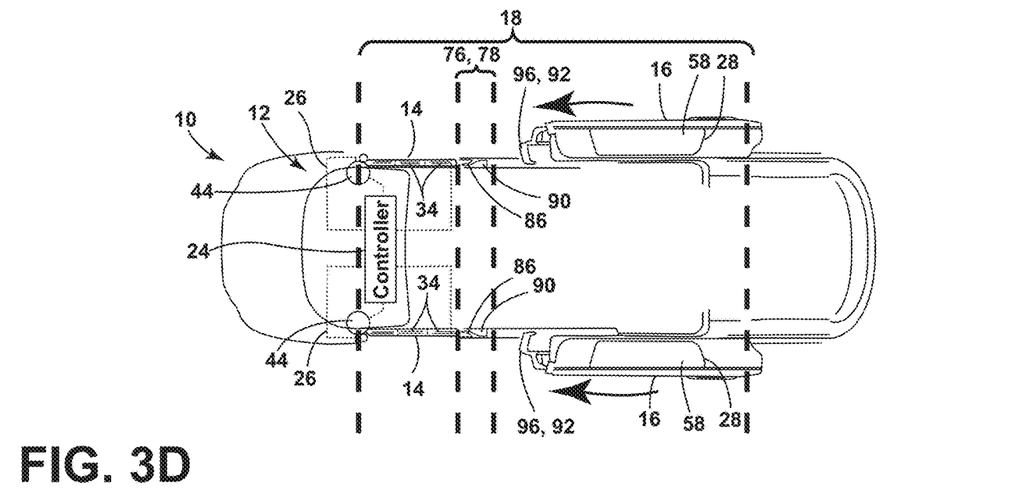
FIG. 3D is a top schematic view of a vehicle comprising an automatic door system of a rear sliding door in a half-open position and a front-hinged door in a closed position demonstrating a continuous opening and an interference zone.
Figure 3E:
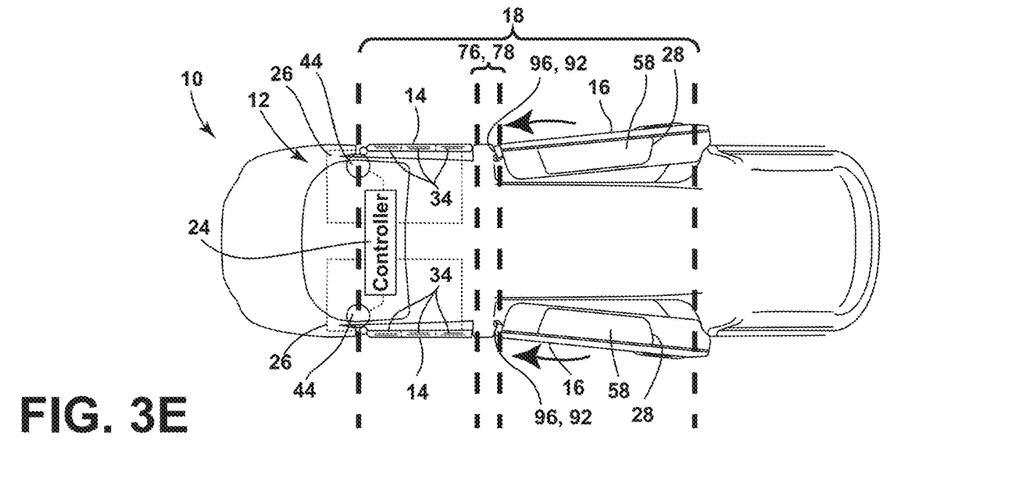
FIG. 3E is a top schematic view of a vehicle comprising an automatic door system of a rear sliding door in an open position and a front-hinged door in a closed position demonstrating an interference zone and a partially open sliding door area.

Referring now to FIGS. 3C, 3D, and 3E, the sliding door 16 is shown being controlled through a portion of a closing operation of the sliding door 16, wherein the controller 24 controls the sliding door 16 from the opened sliding position to the partially open position 76, wherein a leading edge of the sliding door 16 is spaced from the hinged door 14 in the secure or latched position. In some implementations, the controller 24 may be configured to control the hinged position of the hinged door 14 to close, as depicted in FIGS. 3A and 3B, contemporaneously or concurrently to the control of the closure of the sliding door 16 from the open sliding position to the partially open position 76. In operation, the controller 24 may hold the sliding door in the partially open position 76 until the hinged door 14 is detected to be closed and/or latched. In this configuration, the final detection of any obstructions between the hinged door 14 and the sliding door 16 along the continuous opening 18 may be detected in reference to the operation of the sliding door 16 approaching a stationary and latched hinged door 14.

As illustrated in FIGS. 3C, 3D, and 3E, the controller controls the second power actuator 28 to translate the position of the sliding door 16 from the fully open position shown in FIG. 3C to the partially open position 76 or spaced configuration relative to the hinged door 14 as depicted in FIG. 3E. In response to the motion or control of the sliding door 16, the controller 24 may activate the display 72 to display a "Cancel/Re-open" user input option, activate the speaker 74 to emit an audible sound indicating a movement of the sliding door 16, and activate the plurality of proximity sensors 32. In response to the controller 24 receiving the input option of the "Cancel/Re-open", the controller 24 may cancel the closing door operation and move the sliding door 16 to the open sliding position. Once the sliding door 16 is controlled and detected in the partially open position 76, the controller may activate a specialized detection scheme that may be more sensitive and/or adjust the position of the sliding door 16 at a decreased rate within the interference zone 78. Accordingly, as the controller 24 controls the position of the sliding door 16 from the partially open position 76 through the interference zone 78, the controller 24 may be configured to adjust a sensitivity or sensory range of the proximity sensors 32 and/or activate the interference sensors 34 to detect potential obstructions in the interference zone 78.

Figure 4A:
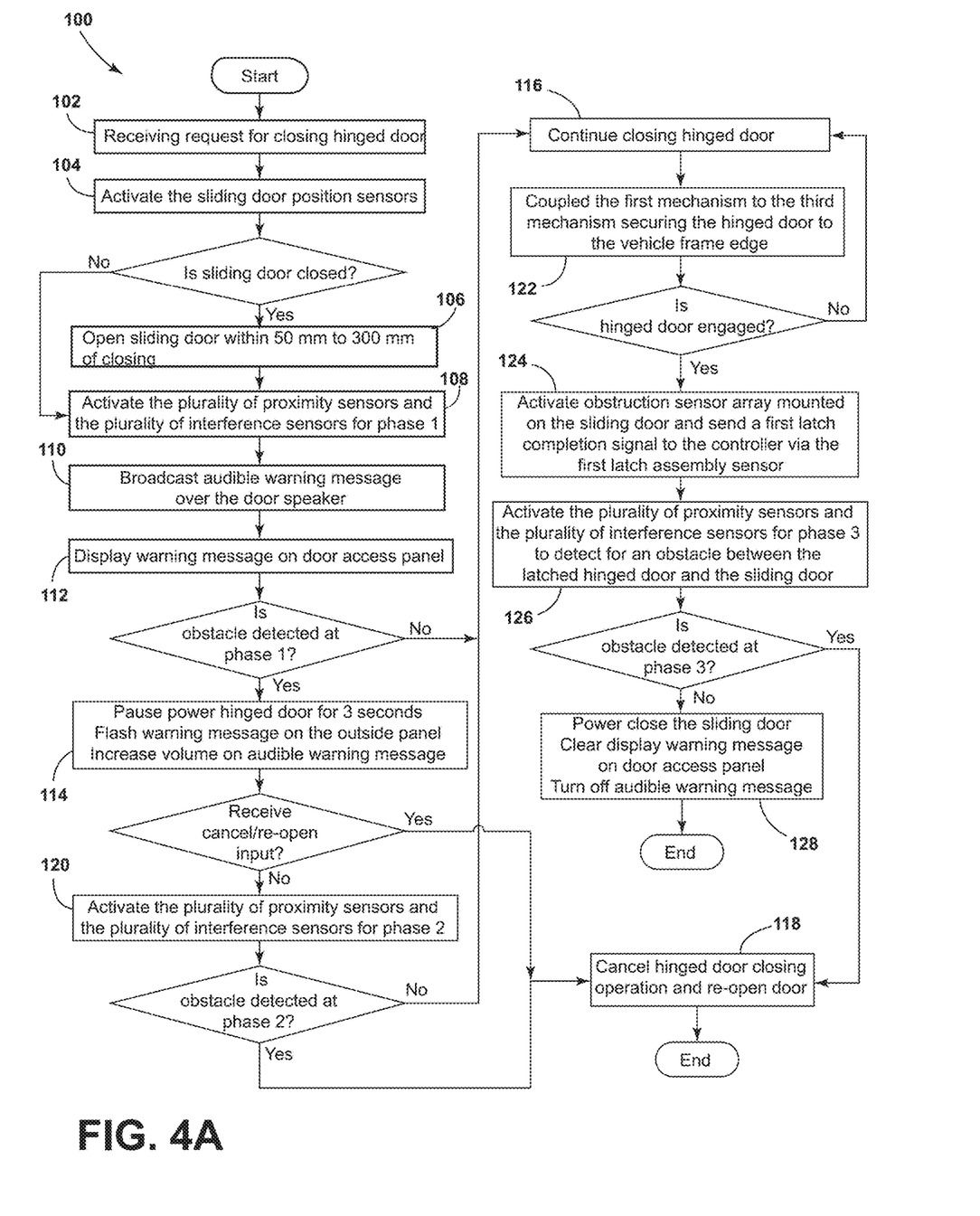
FIG. 4A is a flow chart of a method of an autonomous vehicle closing a hinged door.

Referring to FIG. 4A, a flow chart of a method 100 for the system closing a hinged door 14 is shown. The method 100 may begin by receiving a request for closing the hinged door 14 (102). In response to receiving the input signal from the request, the controller 24 may activate the sliding door position sensor 64 to identify whether the sliding door 16 is in an open position or a closed position (104). In response to the sliding door 16 being in a closed position, the controller 24 may activate the second power actuator 28 to open the sliding door 16 approximately 50 mm to 300 mm (106). In response to the sliding door 16 being in an open position, the controller 24 may activate the plurality of proximity sensors 32 and the plurality of interference sensors 34 to scan for any obstructions 42 in a first closing phase (108). To further clarify, the first phase may comprise step 102, receiving request for closing hinged door, through step 108, activating the plurality of proximity sensors and the plurality of interference sensors. Additionally, the controller 24 may broadcast the audible noise over the speaker 74 (110) and display notification words on the display 72 (112).

In response to the plurality of proximity sensors 32 and/or the plurality of interference sensors 34 detecting an obstruction 42 during the first phase, the controller 24 may pause the hinged door 14 for a designated set time, such as three seconds. The controller 24 may also flash the notification words on the display 72 and/or increase the volume of the audible noise over the speaker 74 (114). Additionally, the controller 24 may show the "Cancel/Re-open" input option on the display 72. In response to the sensors 32, 34 not detecting an obstruction 42 during the first phase, the controller 24 may continue closing the hinged door 14 until the hinged door 14 is engaged to the vehicle body edge 40 (116).

In response to the controller 24 receiving an input signal of "Cancel/Re-open", the controller 24 may cancel the hinged door closing operation and/or re-open the hinged door 14 (118). In response to the controller 24 not receiving the input signal, the controller 24 may activate the plurality of proximity sensors 32 and the plurality of interference sensors 34 again to detect an obstruction during a second closing phase (120). The second phase may comprise the controller 24 detecting an obstacle after step 114. In response to the detection, the hinged door 14 may be paused for three seconds or a set time. Additionally, the controller may control the display 72 to flash a warning message, and/or control a volume of an audible warning message. The second phase may further comprise steps 114 and 120, which may occur after the hinged door 14 is paused for the set amount of time.

In response to the controller detecting an obstruction during the second phase, the controller 24 may terminate the hinged door closing operation and/or re-open the hinged door 14 (118). In some embodiments, the controller 24 may additionally output an obstruction detection signal, which may activate an alarm or notification to alert an operator or occupant of the vehicle 12 of the obstruction 42 detection. In response to the controller 24 not detecting an obstruction during the second phase, the controller 24 may continue closing the hinged door 14 to engage the vehicle body edge 40 (122). As the hinged door 14 is repositioned, the controller 24 may continue to monitor the hinged door position until the first mechanism 82 is coupled to the third mechanism 86 securing the hinged door 14 to the vehicle body edge 40.

In response to the first latch assembly sensor 90 signaling to the controller 24 the hinged door 14 is secured to the vehicle body edge 40, the controller 24 may begin to control the sliding door in a third phase. During the third phase, the controller 24 may activate the obstruction sensor array 96 mounted on the sliding door (124). Additionally, the controller 24 may activate the plurality of proximity sensors 32 and a plurality of interference sensors 34 to detect an obstruction 42 between the hinged door 14 and the sliding door 16 (126). Accordingly, the third phase may comprise steps following the latching or securing of the hinged door 14. In response to an obstruction 42 detection, controller 24 may terminate the hinged door closing operation and/or re-open the sliding door 16 (118). In response to the controller 24 not detecting an obstruction 42, the controller 24 may power close the sliding door 16 the last approximate 50 mm to 300 mm and/or send a termination signal to the controller 24, which may clear the display notifications on the display and/or turn off the audible messages from the speaker 74 (128).

Figure 4B:
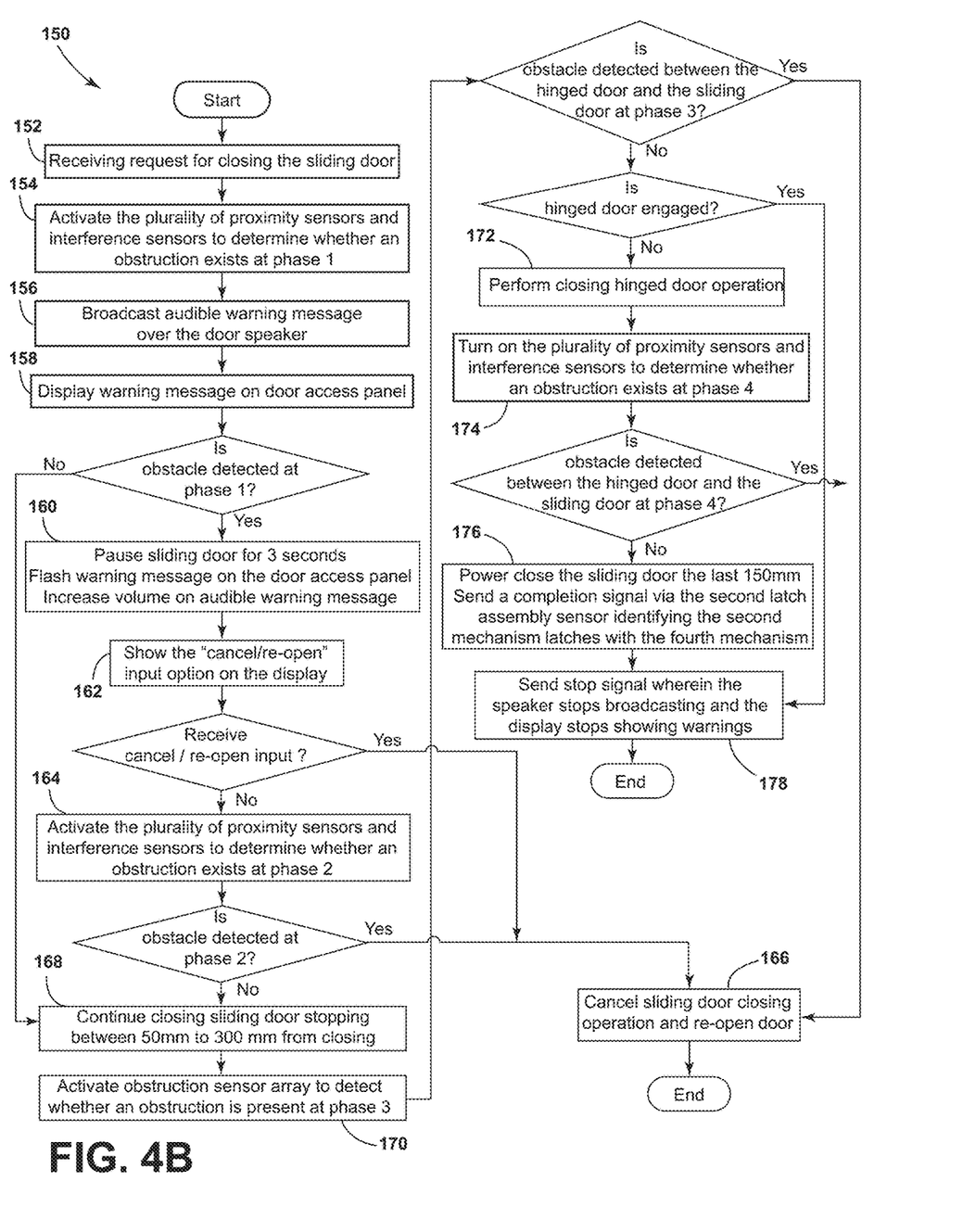
FIG. 4B is a flow chart of a method of an autonomous vehicle closing a sliding door.

Now referring to FIG. 4B, a flow chart of a method 150 for the system closing a sliding door 16 is shown. The method 150 may begin by receiving a request for closing the sliding door 16 (152). In response to receiving an input signal for the request of closing the sliding door 16, the controller 24 may activate the plurality of proximity sensors 32 and a plurality of interference sensors 34 to determine if any obstructions 42 are in a pathway of the sliding door 16 closing (154). The controller 24 may also broadcast audible noise over the speaker 74 (156). The controller 24 may also flash the notification words on the display 72 and/or increase the volume of the audible noise prior to and/or during the second power actuator 28 closing the sliding door 16 (158). In response to the controller 24 detecting an obstruction 42 during the first phase, the controller 24 may also flash the notification words on the display and/or increase the volume of the audible noise and hold the sliding door from movably covering the continuous opening for a set time (160). Additionally, the controller 24 may show the "Cancel/Re-open" input option on the display (162).

In response to the controller 24 not receiving the input signal, the controller 24 may activate the plurality of proximity sensors and the plurality of interferences sensors again to detect an obstruction for a second time during a second phase (164). In response to the controller 24 detecting an obstruction during the second phase, the controller 24 may then terminate the hinged door closing operation and/or re-open the hinged door (166). In some embodiments, the controller 24 may additionally output an obstruction detection signal, which may activate an alarm or notification to alert an operator or occupant of the vehicle 12 of the obstruction detection. In response to the controller 24 not detecting an obstruction during the second phase, the controller 24 may then continue closing the sliding door stopping at approximately 150 mm from closing (168). As the sliding door 16 reaches approximately 150 mm from closing, the controller 24 may activate the obstruction sensor array 96 and detect whether an obstruction is present during a third phase (170).

In response to an obstruction being present during the third phase, the controller 24 may terminate the sliding door operation and re-open the sliding door (166). In response to an obstruction not being present during the third phase, the controller performs the closing hinged door operation starting at step (108). In step (124), if the hinged door 14 is secured to the vehicle body edge 40, the controller 24 may continue to step (172) of the closing sliding door method (150) to detect whether an obstruction is within the approximately 150 mm between the closed hinged door 14 and the sliding door 16 during a fourth phase. In response to the obstruction being present during the fourth phase, the controller may terminate the sliding door close operation and/or re-open the sliding door 16 (166). In response to the obstruction not being present during the fourth phase, the controller 24 may signal the second power actuator 28 to continue closing the sliding door 16 until the second mechanism 84 latches with the fourth mechanism 88 of the latch assembly 30 (174). In response to the second mechanism 84 latching with the fourth mechanism 88, the second latch assembly sensor 92 may send a completion signal to the controller 24 (176). In response to the controller 24 receiving the completion signal, the controller 24 sends a stop signal to the speaker 74 and the display 72, wherein the speaker stops broadcasting audible noise and the display stops displaying notification words (178).

Figure 5:
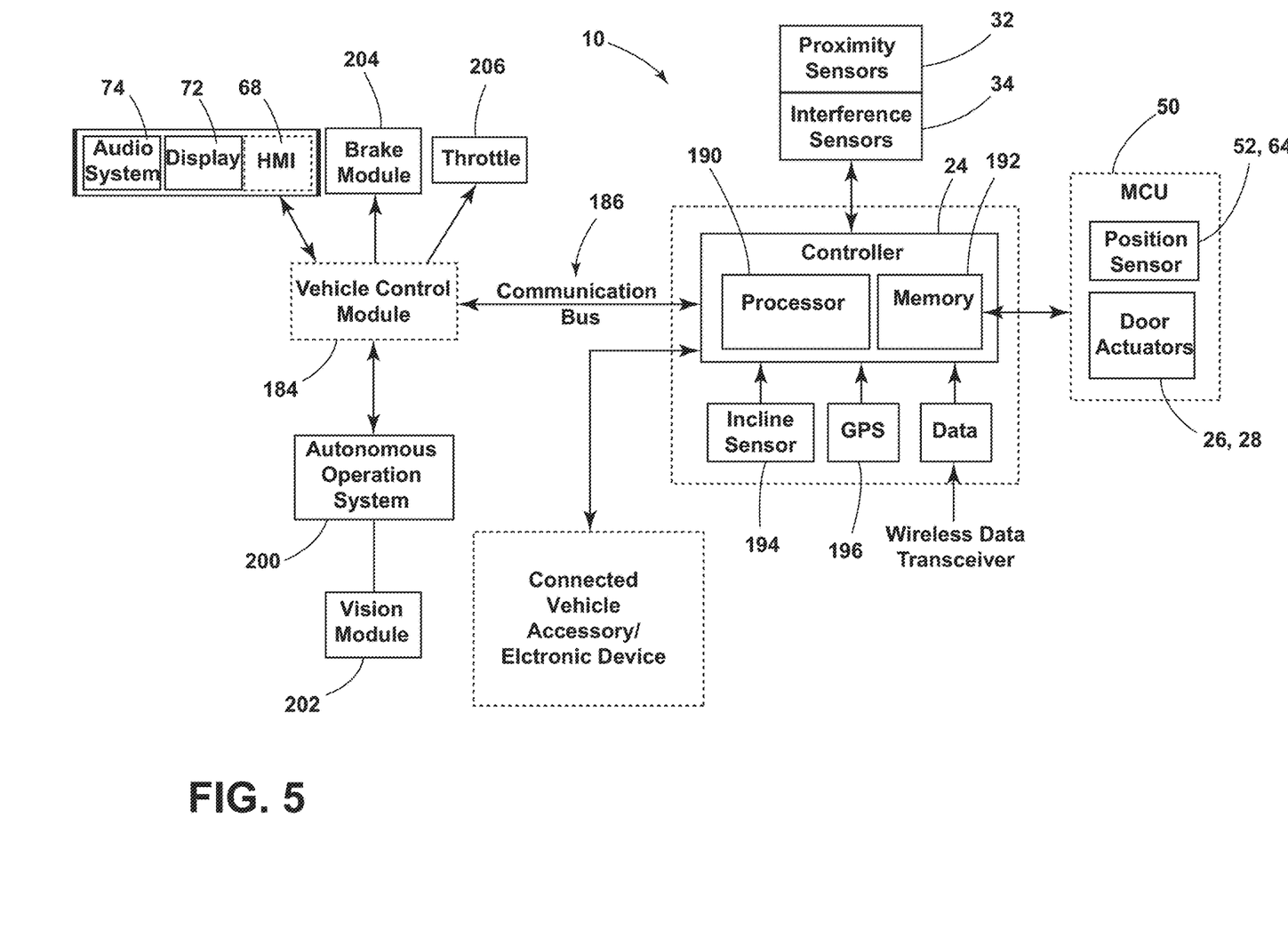
FIG. 5 is a block diagram of an automatic door system configured to control a position operation of the door in accordance with the disclosure.

Now referring to FIG. 5, a block diagram of the system 10 configured to control a position operation of the hinged door 14 and the sliding door 16 in accordance with the disclosure is shown. The system 10 comprises the controller 24 may be in communication with the first power actuator 26 to determine the position of the hinged door 14 and configured to control the angular position φ of the hinged door 14. The controller 24 may also be in communication with the second power actuator 28 to determine the position of the sliding door 16 and control the sliding position of the sliding door 16. The controller 24 may comprise the motor control unit 50 and a feedback motion control configured to accurately position the hinged door 14 about the hinge assembly 44 and the sliding door 16 about the sliding assembly 58 in a smooth and controlled motion path. The controller 24 may further be in communication with a hinged door position sensor 52 as well as a sliding door position sensor 64 to provide closed loop feedback control. The controller 24 may also further be in communication with a plurality of interference sensors 34 and/or at least one or a plurality of proximity sensors 32. The hinged door position sensor 52 is configured to identify an angular position φ of the hinged door 14. The sliding door position sensor 64 is configured to identify a position of the sliding door 16 on the sliding assembly 58. The plurality of interference sensors 34 and the plurality of proximity sensors 32 may be configured to identify a potential obstruction that may prevent operation of the system 10 and/or vehicle 12.

The controller 24 may also be in communication with a vehicle control module 184 via a communication bus 186 of the vehicle. The communication bus 186 may be configured to deliver signals to the controller 24 identifying various vehicle states. For example, the communication bus 186 may be configured to communicate to the controller 24 a drive selection of the vehicle 12, an ignition state, an open and/or ajar status of the hinged door 14 and/or the sliding door 16, etc. The vehicle control module 184 may also communicate with the user interface 68, the display 72, and the speakers 74. The user interface 68 may also be known as a Human Machine Interface (HMI) for the implementation of the above-described learning and identification modes. The controller 24 may comprise a processor 190 comprising one or more circuits configured to receive the signals from the communication bus 186 and output signals to control the system 10. The processor 190 may be in communication with a memory 192 configured to store instructions to control the activation of the system 10.

For example, the controller 24 may be in communication with a vehicle control module 184 via a communication bus 186 configured to detect a user input to perform a closing door operation, detect a position of the sliding door 16 and the hinged door 14 via the first and second position sensors 52, 64, and detect the first accelerometer 54 and second accelerometer 66 to determine movement of the sliding door 16 and the hinged door 14.

The controller 24 may also be configured to control the first power actuator 26 to adjust the hinged door 14 from the open position to the closed position and control the angular position φ of the hinged door 14 therebetween. The first power actuator 26 may be any type of actuator that is capable of transitioning the hinged door 14, including, but not limited to, electric motors, servo motors, electric solenoids, pneumatic cylinders, hydraulic cylinders, etc. The hinged door position sensor 52 may correspond to a variety of rotational or position sensing devices. In some embodiments, the position sensor may correspond to an angular position sensor configured to communicate the angular position φ of the door to the controller 24 to control the motion of the first power actuator 26. The hinged door position sensor 52 may correspond to an absolute and/or relative position sensor. Such sensors may include, but are not limited to, encoders, potentiometers, accelerometers, etc. The hinged door position sensor 52 may also correspond to optical and/or magnetic rotational sensors. Other sensing devices may also be utilized for the hinged door position sensor 52 without departing from the spirit of the disclosure.

The controller 24 may comprise an incline sensor 194. The incline sensor 194 may correspond to a variety of sensors and in some implementations may correspond to a tilt sensor, accelerometer, gyroscope or any other device operable to measure the vehicle 12 oriented on an incline relative to gravity. The incline sensor 194 may communicate the incline of the vehicle 12 to the controller 24 such that, when the hinged door 14 and/or the sliding door 16 are arranged in the open position or a partially open position, the controller 24 may be configured to activate the first power actuator 26 and second power actuator 28, respectively, to prevent each door 14, 16 from swinging open, closing, or changing position. In this way, the controller 24 may identify that the vehicle 12 is parked or oriented at an angle and prevent each door 14, 16 from swinging under the force of gravity.

The controller 24 may also comprise a positioning device or GPS device 196 configured to receive positioning data and may also be configured to receive wireless data via a wireless data transceiver. The positioning data and/or the wireless data may be utilized to determine a location of the vehicle 12 and the weather conditions of that location. Based on the weather conditions and position of the vehicle 12, the controller 24 may be configured to identify periods when each door 14, 16 may likely be unexpectedly repositioned due to a wind gust or elevated wind speeds. The weather information may be accessed by the controller 24 via a wireless data transceiver configured to wirelessly communicate data. The data may be wirelessly communicated via GSM, CDMA, WiFi, or any other form of wireless data communication protocol.

The controller 24 may also further be in communication with an autonomous operation system 200. This may be achieved indirectly through the communication of controller 24 with vehicle control module 184, which may implement the functionality of the autonomous operation system 200 or may be in communication therewith. Autonomous operation system 200 can receive data from a vision module 202 and from GPS device 196 to determine a path for autonomous driving and can implement movement of vehicle 12 along such a path by communication with brake module 204 and with throttle 206. The communication of controller 24 with autonomous operation system 200 may allow the autonomous operation system to receive data related to the angular position φ of the hinged door 14 relative to the continuous opening 18 or related to a condition of sliding door 16 between an open condition and a closed condition, such that autonomous movement of vehicle 12 is prevented when one or more doors of vehicle 12 is in the open condition.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An automatic door system of a vehicle, the automatic door system comprising:
    a hinged door in connection with the vehicle configured to selectively enclose a continuous opening formed between a first pillar and a second pillar of the vehicle, wherein a hinged position of the hinged door is controlled by a first power actuator;
    a sliding door in connection with the vehicle configured to selectively enclose the continuous opening formed between the first pillar and the second pillar, wherein a sliding position of the sliding door is controlled by a second power actuator;
    at least one latch assembly configured to couple a distal end of the hinged door to the vehicle; and
    a controller configured to:
        monitor the hinged position and the sliding position;
        in response to receiving a door operation command to close the hinged door with the sliding door being in a closed sliding position and the hinged door being in an open hinged position:
            control the second power actuator to movably engage the sliding door to a partially open position; and
            control the first power actuator to movably engage the hinged door from an open hinged position to a closed hinged position, wherein the closed hinged position covers a first portion of the continuous opening; and
        in response to the hinged door in the closed hinged position, control the second power actuator to return the sliding door from the partially open position to a closed sliding position.

2. The door system according to claim 1, in response to the door operation command to close the hinged door and the sliding door, with the hinged door and the sliding door being in the open hinged position and the partially open position, respectively, the controller is further configured to:
    control the first actuator and the second actuator to adjust a position of the hinged door and the sliding door, respectively;
    hold the sliding door in the partially open position until the first actuator adjusts the hinged door into the closed hinged position.

3. The door system according to claim 1, wherein the controller is further configured to:
    control the second actuator to control the sliding position to approximately 20 mm to 300 mm away from the distal end of the hinged door in the partially open position.

4. The door system according to claim 3, further comprising:
    a proximity sensor coupled to the distal end of the hinged door, wherein the proximity sensor is configured to detect an obstruction in the continuous opening between the distal end of the hinged door and an adjacent end of the sliding door.

5. The door system according to claim 4, wherein the controller is configured to adjust a detection range of the proximity sensor in response to a change in a position of the sliding door.

6. The door system according to claim 5, wherein the controller is further configured to hold a position of the sliding door for a set time, in response to the proximity sensor detecting the obstruction.

7. The door system according to claim 1, further comprising:
a user interface coupled to an exterior panel of the vehicle, wherein the controller is further configured to reverse a movement of at least one of the hinged door and the sliding door via the first power actuator and the second power actuator, respectively, in response to receiving a stop door operation input as communicated by the user interface.

8. The door system according to claim 1, further comprising:
a proximity sensor coupled to a handle of the hinged door, wherein the proximity sensor is configured to detect an obstruction in the continuous opening between the distal end of the hinged door and an adjacent end of the sliding door.

9. The door system according to claim 8, further comprising:
a sliding door position sensor in connection with the second power actuator, wherein the controller is configured to adjust a detection range of the proximity sensor in response to a change in a position of the sliding door as communicated by the sliding door position sensor.

10. The door system according to claim 9, wherein the controller is further configured to stop the sliding door from movably enclosing the continuous opening, in response to the proximity sensor detecting the obstruction.

11. The door system according to claim 1, wherein the at least one latch assembly engages a perimeter of the continuous opening securing the sliding door and the hinged door enclosing the continuous opening.

12. A method for controlling a door system of a vehicle, the vehicle comprising a continuous opening formed between a first pillar coupled to a proximal end of a hinged door of the vehicle and a second pillar coupled to a sliding door assembly of a sliding door of the vehicle with the hinged door being in an open hinged position and the sliding door being in an open sliding position, the method comprising:
determining a hinged door position and a sliding door position;
receiving a door operation command;
controlling a first actuator to adjust the hinged door to a closed hinged position;
controlling a second actuator to hold the sliding door in a hold position as the sliding door approaches a partially open position as communicated by a sliding door position sensor;
determining the hinged door is in the closed hinged position;
controlling the second actuator to return the sliding door from the partially open position at the hold position to a closed sliding position; and
detecting a sliding latch signal via a latch assembly sensor, wherein the sliding door is in the closed sliding position and an adjacent end of the sliding door couples to a distal end of the hinged door.

13. The method according to claim 12, further comprising:
adjusting a detection range of a proximity sensor coupled to the distal end of the hinged door configured to detect a sliding door edge in response to a change in a position of the sliding door as communicated by the sliding door position sensor.

14. The method according to claim 13, further comprising:
stopping the sliding door from movably enclosing the continuous opening for a set time in response to the proximity sensor detecting an obstruction between the hinged door in the closed hinged position and the sliding door in at least one of the partially open position and the open sliding position.

15. The method according to claim 12, further comprising:
adjusting a detection range of a proximity sensor coupled to a hinged door handle configured to detect a sliding door edge in response to a change in a position of the sliding door as communicated by the sliding door position sensor.

16. An automatic door system of a vehicle comprising a continuous opening formed between a first pillar and a second pillar of the vehicle and a hinged door coupled to the vehicle controlled by a first power actuator configured to selectively cover a first portion of the continuous opening, the automatic door system further comprising:
a sliding door coupled to the vehicle configured to selectively enclose a second portion of the continuous opening, wherein a sliding position of the sliding door is controlled by a second power actuator;
a latch assembly configured to engage a distal end of the hinged door with an adjacent end of the sliding door;
a sliding door position sensor in connection with the second power actuator;
a latch assembly sensor electrically coupled to the latch assembly configured to detect the distal end of the hinged door engaged with the adjacent end of the sliding door;
a controller configured to:
detect the hinged door is in a closed hinged position and the sliding door is in an open sliding position as communicated by the sliding door position sensor;
in response to a door operation command, control the second power actuator to movably engage the sliding door along a track from the open sliding position to a closed sliding position, wherein the closed sliding position covers the second portion of the continuous opening; and
detect a sliding latch signal via the latch assembly sensor, wherein the sliding door is in the closed sliding position and the adjacent end of the sliding door engages with the distal end of the hinged door.

17. The door system according to claim 16, further comprising:
a proximity sensor coupled to the distal end of the hinged door, wherein the proximity sensor is configured to detect an obstruction in the continuous opening between the distal end of the hinged door and the adjacent end of the sliding door.

18. The door system according to claim 17, wherein the controller is configured to adjust a detection range of the proximity sensor in response to a change in a position of the sliding door as communicated by the sliding door position sensor.

19. The door system according to claim 18, wherein the controller is further configured to stop the sliding door from movably enclosing the continuous opening for a set time in response to the proximity sensor detecting the obstruction.

20. The door system according to claim 16, further comprising:
   a proximity sensor coupled to a handle of the hinged door, wherein the proximity sensor is configured to detect an obstruction in the continuous opening between the distal end of the hinged door and the adjacent end of the sliding door.

* * * * *